UNITED STATES PATENT OFFICE.

AUGUSTUS O. BOURN, OF BRISTOL, RHODE ISLAND.

VULCANIZATION.

1,203,966.  Specification of Letters Patent.  Patented Nov. 7, 1916.

No Drawing.  Application filed January 7, 1916.  Serial No. 70,876.

*To all whom it may concern:*

Be it known that I, AUGUSTUS O. BOURN, a citizen of the United States, and resident of the town of Bristol, in the county of Bristol and State of Rhode Island, have invented certain new and useful Improvements in Vulcanization, of which the following is a specification.

The object of this invention is to provide a new and improved process for rendering more perfect the vulcanization of certain substances, and the invention consists essentially in adding a certain percentage of creosote to a mixture of rubber substitutes with rubber containing the usual vulcanizing ingredients for the purpose of obtaining a more perfect vulcanizing effect upon the substitutes when the whole is subjected to the vulcanizing process.

Heretofore, substitutes for rubber have been commonly made of vegetable oils that have been partially vulcanized, and also of vulcanized rubber which has been reclaimed and these substitutes have been mixed with india rubber containing the usual vulcanizing ingredients. This mixture is fashioned or formed into various articles which are then subjected to the usual vulcanizing process during which the substitutes are subjected to a second or further vulcanizing. The finished articles made from such mixtures are found to have less strength and durability than articles which are made from india rubber properly compounded, without the mixture of rubber substitutes.

It is found in practice that by adding a small proportion of creosote distilled from wood to a mixture of substitutes with rubber containing the usual vulcanizing ingredients, that the substitutes are rendered susceptible to a more perfect vulcanization, and that articles made from this mixture approach in strength and durability similar articles made from the usual rubber compounds without the substitutes. Therefore, it will be seen that the action of wood creosote upon the substitutes greatly enhances the value and usefulness of the product.

The quantity of wood creosote to be mixed with the substitutes will vary with the nature of the substitutes as well as with the kind and proportion of india rubber and compounds employed and the time and temperature employed in the vulvanization. I have found that with the commercial substitute made from corn oil mixed with india rubber and the vulcanizing ingredients commonly used for rubber boots and shoes, excellent results can be obtained by adding from three to five ounces of the wood creosote to fifteen pounds of rubber and ten and one-half pounds of the substitute to which mixture is to be added the usual vulcanizing ingredients.

I have found in practice that vulcanized goods made from substitutes compounded in the manner above described approach in strength and durability similar articles made from the usual rubber compounds which do not contain the substitutes. Thus it will be seen that by the use of the creosote with the substitute, a strong and durable product may be obtained at a considerable saving in cost of the raw material.

I have set forth in this specification the advantage of adding a small proportion of creosote to a mixture of rubber substitute, but the creosote may be added to the substitute before mixing the same with the india rubber or rubber compounds, or it may be mixed with the rubber compound first, or the india rubber and rubber substitutes and rubber compounds may be mixed together before the creosote is added to them. The broad idea of the invention being the mixing of creosote, rubber substitutes, and rubber or the rubber compounds, for the purpose of facilitating the vulcanization of the mixture to improve the quality and reduce the cost of the product.

I claim:

1. The improved process for vulcanizing which consists in mixing wood creosote, rubber substitutes, and rubber compound and subjecting the whole to a vulcanizing heat.

2. An improved process for vulcanizing which consists in mixing wood creosote, partially vulcanized vegetable oils and rubber compound, and subjecting the whole to a vulcanizing heat.

3. An improved process for vulcanizing which consists in mixing reclaimed rubber, rubber compound and creosote and vulcanizing the whole.

In testimony whereof I affix my signature in presence of two witnesses.

AUGUSTUS O. BOURN.

Witnesses:
  HOWARD E. BARLOW,
  A. F. MACREADY.